United States Patent [19]
Karnwie-Tuah

[11] Patent Number: 5,559,493
[45] Date of Patent: Sep. 24, 1996

[54] AUTOMOBILE ANTI-THEFT DEVICE

[76] Inventor: Daniel Karnwie-Tuah, 605 Harriet Ave., Apt. No. 509, Shoreview, Minn. 55126

[21] Appl. No.: 238,427

[22] Filed: May 5, 1994

[51] Int. Cl.$^6$ ................................................. B60R 25/10
[52] U.S. Cl. ................ 340/426; 340/428; 340/825.31; 361/172; 307/10.4
[58] Field of Search .................... 340/425.5, 428, 340/453, 825.31, 426; 361/171, 172; 307/10.4, 10.5

[56] References Cited

U.S. PATENT DOCUMENTS

| | | | |
|---|---|---|---|
| 3,776,263 | 12/1973 | Hubenthal | 137/384.8 |
| 3,834,484 | 9/1974 | Sangster | 180/287 |
| 4,494,114 | 1/1985 | Kaish | 340/825.31 |
| 4,852,680 | 8/1989 | Brown et al. | 180/287 |
| 4,991,683 | 2/1991 | Garretto et al. | 180/287 |
| 5,020,344 | 6/1991 | Garcia | 70/245 |
| 5,023,591 | 6/1991 | Edwards | 340/426 |
| 5,045,837 | 9/1991 | Gosker | 340/426 |
| 5,193,641 | 3/1993 | Durrell | 180/287 |
| 5,422,632 | 6/1995 | Bucholtz et al. | 340/825.31 |
| 5,448,218 | 9/1995 | Espinosa | 340/426 |

*Primary Examiner*—Jeffery Hofsass
*Assistant Examiner*—Daniel J. Wu
*Attorney, Agent, or Firm*—Palmatier, Sjoquist, Helget & Voigt, P.A.

[57] ABSTRACT

An automobile anti-theft device connected to the electrical system and fuel line of a vehicle. A control unit is positioned proximate to an operator of an automobile. The control unit has a first display and a key-pad for the generation of a personal access code for transmission to a circuit unit. The circuit unit includes a programmable read-only memory which compares the personal access code to a stored keyed access. The circuit unit generates a second signal upon acceptance of the personal access code by the programmable read-only memory. The second signal is received by a silicon control rectifier which opens a valve attached to the fuel line of an automobile permitting fuel passage to the engine. The control unit includes a locked retractable penetrating adapter which may be retrieved for modification of the stored key access within the programmable read-only memory. A remotely located programming unit has a receiving adapter, a second display, and a second key-pad for coupling to the retractable penetrating adapter during the modification of the stored key access. The remotely located programming unit may then be stored at a secure location by an individual. A fuel-monitoring transponder and transducer are attached to the fuel line and are in communication with the first display for communicating the passage and consumption of fuel by the vehicle.

20 Claims, 3 Drawing Sheets

AUTOMOBILE ANTI-THEFT DEVICE

BACKGROUND OF THE INVENTION

Automobile theft throughout the world and particularly in the United States of America has arisen to an alarming level. A vehicle is stolen approximately every nineteen seconds within America. In addition, the frequency of car-jacking of automobiles and drivers entering automobiles is sharply increasing.

In the past, fuel cut-off devices have been integrated into the fuel line of an automobile to reduce the ease of theft:. These devices generally include a valve for stopping the flow of fuel to an engine where the valve is controlled by an operating means mounted proximate to the driver's compartment of the vehicle. These fuel cut-off devices are usually configured by a manufacturer to incorporate a pre-set and standardized code access sequence. The standardized and pre-set code access sequences used within these devices soon become known by the criminal elements rendering the automobile auto-theft devices useless. In addition, technical mechanisms are readily available to the criminal elements for neutralizing the operation of the known fuel cut-off devices.

The types of known automobile: anti-theft devices include U.S. Pat. No. 5,045,837 to Gosker et al.; U.S. Pat. No. 3,756,341 to Tonkowich; U.S. Pat. No. 2,550,499 to Bayard; U.S. Pat. No. 4,991,683 to Garreto; and U.S. Pat. No. 3,834,484 to Sangster. These patents in general disclose devices which are inflexible and which fail to permit an individual to personalize or modify an access code for an automobile anti-theft device. In addition, these known automobile anti-theft devices lack a security mechanism preventing tampering by criminals. Furthermore, these automobile anti-theft devices and/or fuel cut-off systems are "non-passive" requiring entry of a code or the manipulation of a key or a switch. These devices are therefore inconvenient to a user, when the systems/devices by their nature are easily defeated by a criminal.

SUMMARY OF THE INVENTION

This invention relates to a automobile anti-theft device for connection to the electrical system and fuel line of a vehicle. A control unit is positioned proximate to an operator of an automobile. The control unit has a first display and a key-pad for the generation of a personal access code for transmission to a circuit unit. The circuit unit includes a programmable read-.only memory which compares the personal access code to a stored keyed access. The circuit unit generates a second signal upon acceptance of the personal access code by the programmable read-only memory. The second signal is received by a silicon control rectifier which opens a valve attached to the fuel line of an automobile permitting fuel passage to the engine. The control unit includes a locked retractable penetrating adapter which may be retrieved for modification of the stored key access within the programmable read-only memory. A remotely located programming unit has a receiving adapter, a second display, and a second key-pad for coupling to the retractable penetrating adapter during the modification of the stored key access. The remotely located programming unit may then be stored at a secure location by an individual. A fuel-monitoring transponder and transducer are attached to the fuel line and are in communication with the first display for communicating the passage and consumption of fuel by the vehicle.

It is a principal object of the present invention to provide a new and improved automobile anti-theft device of relatively simple and inexpensive design, construction, and operation, which improves the safety of a vehicle and which fulfills the intended purpose of reducing automobile theft without fear of injury to persons and/or damage to property.

It is another principal object of the present invention to provide a flexible automobile anti-theft device where the personalized access code used within the device may be easily modified by an individual to enhance the protection of the automobile from theft.

It is still another principal object of the present invention to provide an automobile anti-theft device which simultaneously communicates accurate and detailed fuel consumption information for a vehicle.

It is still another principal object of the present invention to provide an automobile anti-theft device which is resilient and resistant to tampering, bypassing, or neutralization by a criminal, thereby enhancing the protection of a vehicle from theft.

It is still another principal object of the present invention to provide an automobile anti-theft device which improves the safety of an individual operating a vehicle.

It is still another principal object of the present invention to provide an automobile anti-theft device which improves the convenience of use of the device to a vehicle operator.

It is still another principal object of the present invention to provide an automobile anti-theft device which may easily and repeatedly reprogrammed by an individual.

It is still another principal object of the present invention to provide an automobile anti-theft device which is flexible and which may be easily and expeditiously installed into all makes and models of automobiles.

A feature of the present invention is a control unit having a liquid crystal display for visual verification of a personal access code and which displays the fuel consumption for the vehicle.

Another feature of the present invention is a control unit having a first means for input and an operational control chip for generation, processing, and communication of a personal access code.

Still another feature of the present invention is a locked retractable penetrating adaptor in communication with the operational control chip which is used to reprogram the personal access code for the automobile anti-theft device.

Still another feature of the present invention is a circuit unit attached in fuel-flow relationship to a fuel line of a vehicle where the circuit includes a programmable read-only memory having a stored key access for comparison to the personal access code for the automobile anti-theft device.

Still another feature of the present invention is a valve attached in fuel-flow relationship to the fuel line of a vehicle where the valve is in communication with the programmable read-only memory for permitting fuel-flow passage within the fuel line.

Still another feature of the present invention is a remotely located programming unit having an interface operational chip, a second display, a second means for input, and a receiving adaptor for coupling to the penetrating adaptor during modification of the stored key access within the programmable read-only memory.

DETAILED SPECIFICATION OF THE PREFERRED EMBODIMENT

Figure 1:
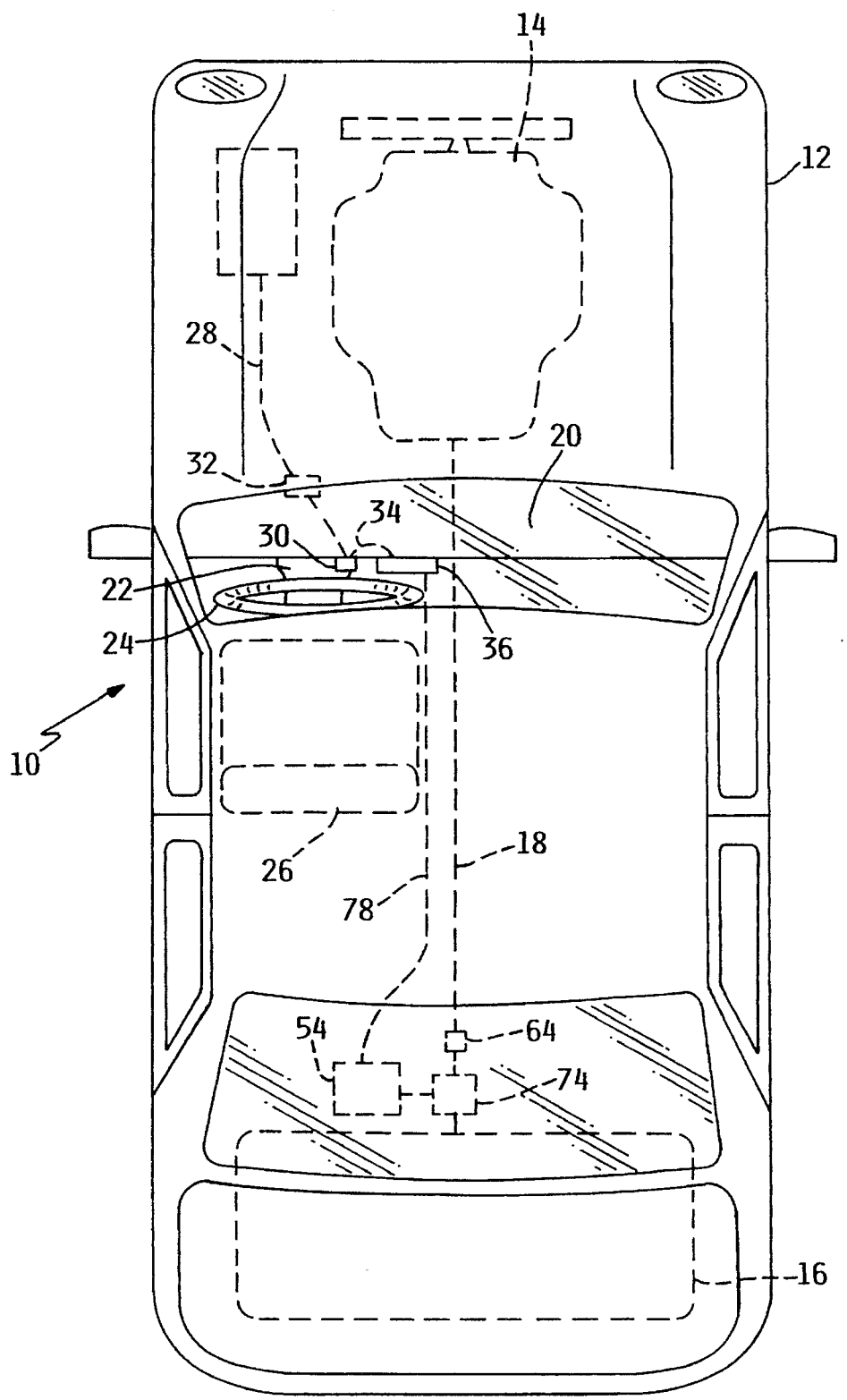
FIG. 1 is an environmental block diagram view of the automobile anti-theft device incorporated into an automobile.

One form of the invention is illustrated and described herein. The automobile anti-theft device is indicated in general by the numeral 10. The automobile anti-theft device 10 is preferably attached to an automobile 12 having an engine 14, a fuel tank 16, a fuel line 18, a dashboard 20, a steering column 22, a steering wheel 24, an operator seat 26, an electrical system 28, and an ignition 30. (FIG. 1 )

The automobile anti-theft device 10 includes a voltage regulator 32 which is preferably connected to the electrical system 28 of the automobile 12 proximate to the ignition 30. The voltage regulator 32 preferably controls the electrical voltage during use of the automobile anti-theft device 10 by regulating the power to either twelve or twenty-four direct current volts as preferred by an individual.

Figure 2:
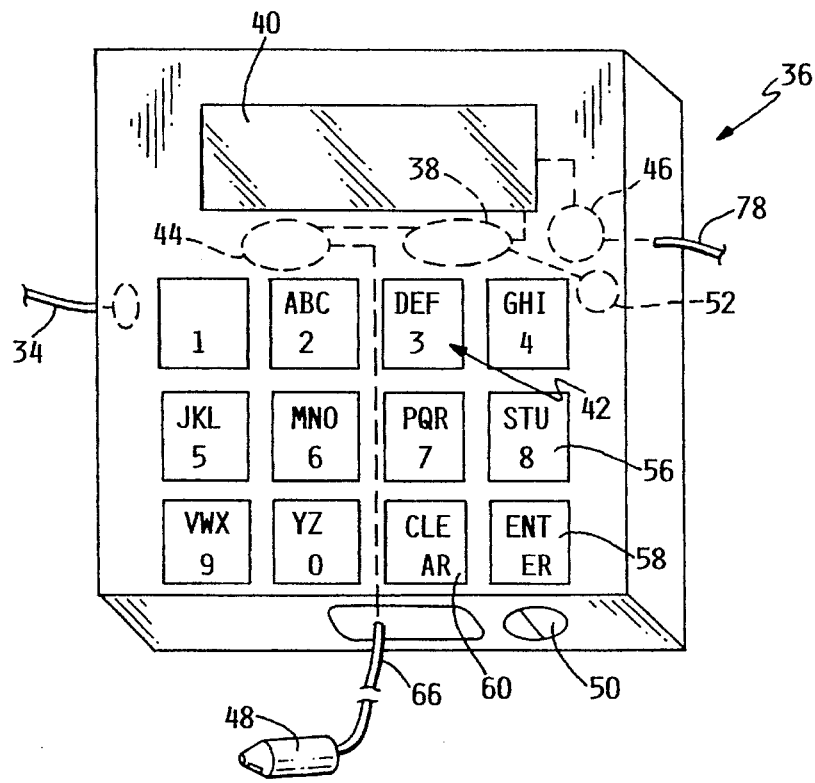
FIG. 2 is a partial phantom line block diagram and a detailed view of the control unit.

A power cable 34 preferably connects the control unit 36 to the voltage regulator 32. In general, the control unit 36 includes an operational control chip 38, a first means for display 40, a first means for input 42, an interface control chip 44, a fuel monitoring microprocessor 46, a retractable penetrating adaptor 48, and a means for locking 50. (FIG. 2)

The control unit 36 is preferably encased within a durable resilient housing which is preferably affixed to the dashboard 20 of an automobile 12 proximate to an operator's seat 26. The housing for the control unit 36 is preferably sealed prohibiting access to the operational systems for the automobile anti-theft device 10. The forcible breach of the resilient casing/housing of the control unit 36 results in the destruction of the electrical connections for the automobile anti-theft device 10 thereby preventing the passage of fuel within the fuel line 18.

In general, the power cable 34 provides the only access into the control unit 36. The control unit 36, as connected to the voltage regulator 32, may become engaged by the manipulation of the ignition 30 for the automobile 12. At this time, an individual is required to manipulate the first means for input 42 for the opening of the fuel line 18 to the engine 14.

The control unit 36 includes an operational control chip 38. The operational control chip 38 is preferably electrically connected to the first means for display 40, the first means for input 42, the interface control chip 44, and the fuel monitoring microprocessor 46. The operational control chip 38 preferably receives the personal access code from the first means for input 42 for processing and communication to the circuit unit 54 during operation of the automobile anti-theft device 10.

The operational control chip 38 functions as an interface between the first means for input 42 and the first means for display 40 for the visualization of the personal access code upon the engagement of the automobile anti-theft device 10. The operational control chip 38 communicates the peripheral access code to the first means for display 40 and the circuit unit 54 for evaluation within the programmable read-only memory 70 during use of the automobile anti-theft device 10. The operational control chip 38 also functions as an interface between the first means for display 40 and the interface control chip 44 during the modification of the personal access code by an individual. Furthermore, the operational control chip 38 functions as an interface between the first means for display 40 and the fuel monitoring microprocessor 46 for the communication and visualization of the fuel consumption of a vehicle.

The operational control chip 38 is preferably a circuit board as is known in the art which may include a plurality of electronic micro-switches for the opening of communication pathways between the operational control chip 38, the first means for display 40, the first means for input 42, the interface control chip 44, the fuel monitoring microprocessor 46, the audio signal transmitter 52, and the circuit unit 54.

The operational control chip 38 generates digital pulses which are transmitted to the circuit unit 54 during operation of the automobile anti-theft device 10. Additionally, digital pulses are transmitted from the operational control unit 38 to the audio signal transmitter 52 upon the acceptance by the circuit unit 54 of the personal access code. Alternatively, the operational control chip 38 may transmit digital pulses to the audio signal transmitter 52 upon the non-acceptance of the personal access code by the circuit unit 54. The ease of theft of an automobile is thereby significantly reduced. An automobile thief is unable to ascertain whether the audio signal transmitter 52 sounds upon either the acceptance or nonacceptance of the personal access code.

The first means for display 40 is preferably a liquid crystal display unit as is known in the art. The first means for display 40 is preferably back-lighted providing for the convenient visualization of an individual's personal access code or the consumption of fuel by a vehicle. The first means for display 40 is preferably located longitudinally across the top portion of the control unit 36 and is positioned at an approximate height upon the dashboard 20 for convenient visualization by an individual. The first means for display 40 enables an individual using the automobile anti-theft device 10 to verify the personal access code for a limited duration of time and accurately monitor the fuel consumption for a vehicle.

The first means for input 42 preferably includes a key pad including a plurality of keys 56 which are preferably marked with alphabetic and numeric identifiers. The keys 56 may alternatively include only alphabetical or numerical markings at the preference of an individual. In the preferred embodiment, a sufficient number of keys 56 is provided to include markings for all the letters of the alphabet and numerals zero through nine for use in the generation of the personal access code. In addition, the first means for input 42 includes enter and clear keys 58 and 60, respectively. The enter key 58 is used to send the personal access code from the control unit 36 to the circuit unit 54. The clear key 60 is used at any time during the operation of a motor vehicle to display the fuel consumption to an accuracy of 1/100 of a gallon. The provision of alphabetical and numeric keys 56 significantly enhances the utility of the automobile anti-theft device 10 to an individual. For many individuals it is easier to recall words as opposed to a number sequence for recall of a personal access code. The provision of alphabetical markings on the keys 56 enables an individual to personalize an access code into any desired lettering or numerical sequence. The instances where an individual forgets their personal access code is thereby reduced.

The first means for input 42 resembles a telephone-style of key pad which includes sensitive hold and repeat keys for soft-touch operation. The benefit of having sensitive hold and repeat keys, and soft-touch operations is to assist in the reduction of unsafe use of a vehicle by an intoxicated driver. The function of the soft-touch hold and repeat keys reduces an individual's ability to disengage the security measures of the automobile anti-theft device 10. The safety to an individual is thereby significantly enhanced.

Figure 3:
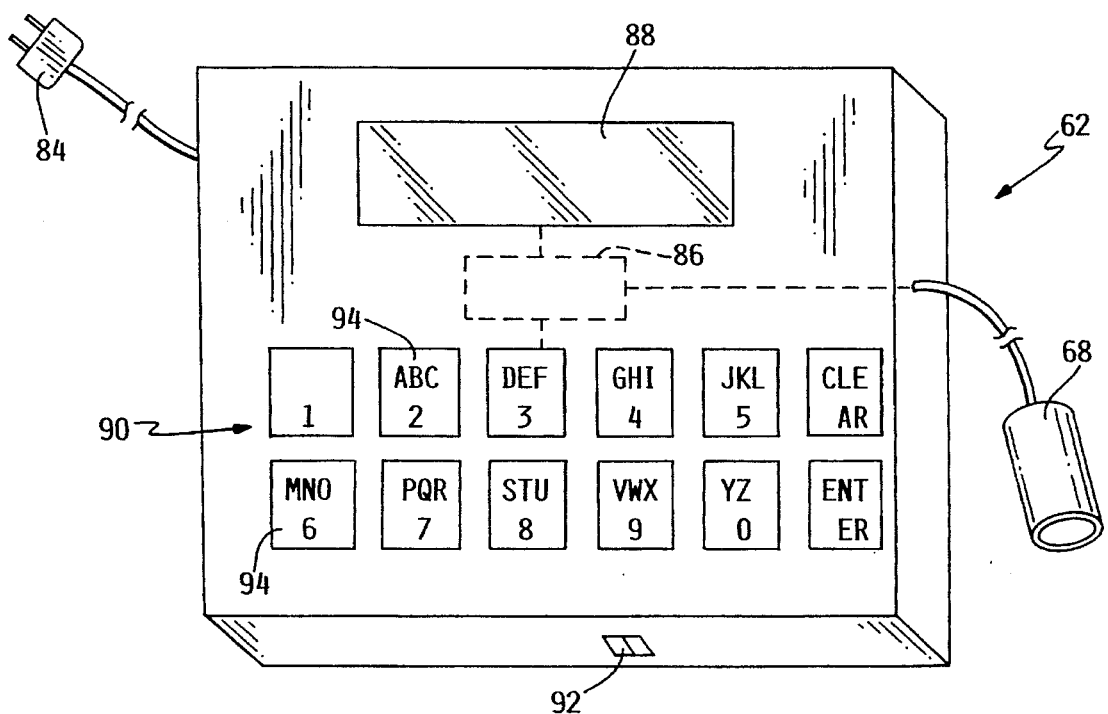
FIG. 3 is a partial phantom line block diagram and a detailed view of the remotely located programming unit.

The interface control chip 44 is preferably electrically connected to, and in communication with, the first means for display 40 and the operational control chip 38. The interface control chip 44 transmits digital pulses from the programming unit 62 (FIG. 3) to the operational control chip 38 for further transmittal and communication to the circuit unit 54 (FIG. 4) during modification of a stored key access which is compared to the personal access code within the programmable mad-only memory 70. The interface control chip 44 (FIG. 2) is preferably an electrical circuit board having electronic micro-switches as is known in the art.

The fuel monitoring microprocessor 46 is preferably electrically connected to, and in communication with, the operational control chip 38 and/or the first means for display 40, and the fuel monitoring means 64. The fuel monitoring microprocessor 46 is preferably an electrical circuit board having processing capabilities for receipt and communication of digital pulses which are transmitted directly to the first means for display 40, or are transmitted through the operational control chip 38 to the first means for display 40 for calculation and communication of the fuel consumption for the vehicle. The fuel monitoring microprocessor 46 includes integrated circuits and counter-integrated circuits for processing of received digital pulses from the circuit unit 54 during the calculation of the vehicle's fuel consumption. The depression of the clear key 60 by an individual displays the fuel consumption for the vehicle.

The control unit 36 includes a retractable penetrating adaptor 48. The retractable penetrating adaptor 48 includes an electrical cable 66. The retractable penetrating adaptor 48 and electrical ,:able 66 are preferably stored internally within the control unit 36 during use of the automobile anti-theft device 10. The electrical cable 66 is preferably connected to the interface control chip 44 providing an electrical and communication pathway through the operational control chip 38 to the circuit unit 54. The retractable penetrating adapter 48 and the electrical cable 66 are preferably securely locked within the interior of the control unit 36 during use of the automobile anti-theft device 10. Alternatively, the retractable penetrating adapter 48 and electrical cable 66 may be electrically attached directly to the operational control chip 38 as preferred by an individual. Preferably the retractable penetrating adaptor 48 is a penetrating input connector which is used to engage the receiving adaptor 68 of the programming unit 62.

A means for locking 50 preferably securely confines the retractable penetrating adaptor 48 and electrical cable 66 within the interior of the control unit 36 during use of the automobile anti-theft device 10. The means for locking 50 may be of any preferred type at the discretion of an individual including but not limited to the use of locks and keys and/or combinations. The means for locking 50 restricts access to the retractable penetrating adaptor 48 thereby preventing an automobile thief from modification of the stored key access within the circuit unit 54.

In the preferred embodiment, a key opens the means for locking 50 providing access to the retractable penetrating adaptor 48. The use of a key with the means for locking 50 enables the individual in possession of the programming 62 to verify an individual's ownership of an automobile prior to the modification or reprogramming of the stored key access. It should be noted that the programming unit 62 is preferably retained by an automobile dealer, police department, or private security firm which may be easily accessible to an individual for modification of the stored key access.

The key for opening the means for locking 50 is preferably provided to an individual at the time of purchase and installation of the automobile anti-theft device 10. Following installation of the automobile anti-theft device, an individual may program his personal access code into the circuit unit 54 and then re-lock the means for locking 50 to prevent further modification of the stored key access.

In the preferred embodiment, the means for locking 50 is electrically intertwined to connector pins which are electrically connected to the operational control chip 38. Forcible breach of, or tampering with, the means for locking 50 damages the connector pins rendering the retractable penetrating adaptor 48 inoperable.

The circuit unit 54 is preferably encased within a durable resilient housing which is formed of reinforced rugged plastic material. The circuit unit 54 may be encased within a durable resilient housing formed of any material at the preference of an individual provided that the essential functions, features and attributes described herein are not sacrificed.

The circuit unit 54 is preferably attached to an automobile 12 proximate or directly to the gasoline tank 16. The circuit unit 54 may be attached to the automobile 12 by the use of mating slots and tabs, grooves and notches, screws, torque screws, and/or any combination thereof as preferred by an individual.

Figure 4:
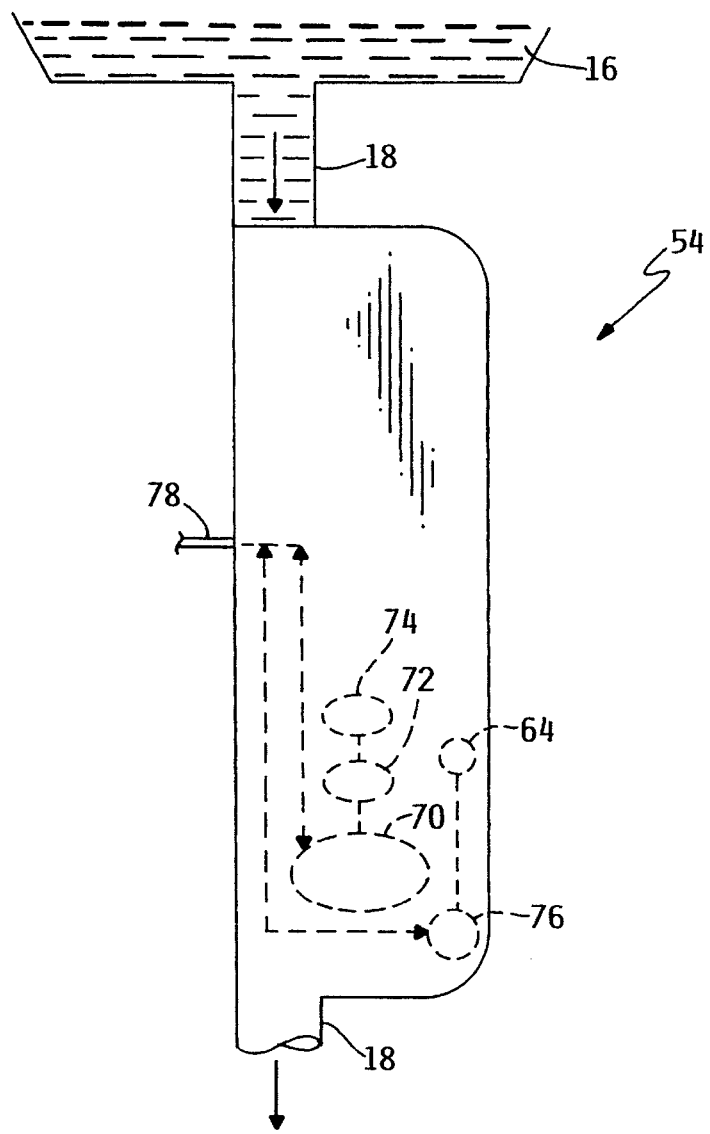
FIG. 4 is a partial phantom line block diagram and a detailed view of the circuit unit.
Figure 5:
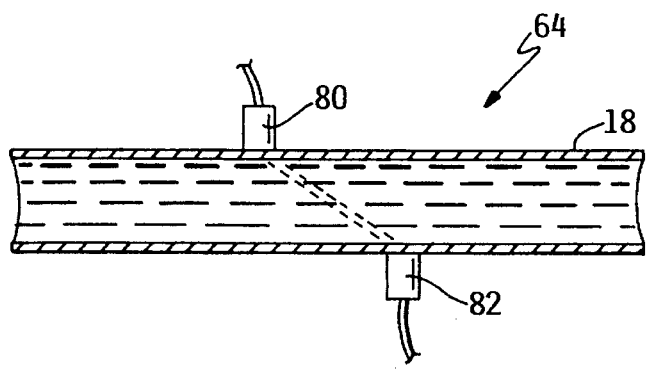
FIG. 5 is a detailed cross sectional side view of the fuel monitoring means taken along the line of 5—5 of FIG. 1.

The circuit unit 54 in general includes a programmable read-only memory 70, a silicon control rectifier 72, and a valve 74. Additionally, the circuit unit 54 may include a fuel signal chip 76. The valve 74 of the circuit unit 54 is preferably attached in fuel-flow relationship to the fuel line 18 of the automobile 12. (FIG. 4)

The circuit unit 54 functions as the central processing unit or brains for the automobile anti-theft device 10. The circuit unit 54 transmits and receives digital pulses for activation of the audio signal transmitter 52. The circuit unit 54 transmits and receives digital pulses from the control unit 36 for communication and acceptance of the personal access code. The circuit unit 54 transmits digital pulses received from the fuel monitoring means 64 for processing by the fuel monitoring microprocessor 46 for further communication to the first means for display 40.

The programmable read-only memory 70 is preferably a circuit board/central processing unit as is known in the art. The programmable read-only memory 70 is preferably electrically connected to, and in communication with, the operational control chip 38 of the control unit 36. The programmable read-only memory 70 receives, stores, verifies, and executes a comparison of digital pulses received from the operational control chip 38 which represent the personal access code transmitted by the first means for input 42 for comparison to a stored key access. The identity between the personal access code and the stored key access allows the programmable read-only memory 70 to generate a digitized pulse of a second signal through semiconductors to the silicon control rectifier 72, which in turn controls the operation or opening of the valve 74. The opening of the valve 74 permits fuel passage within the fuel line 18. The programmable read-only memory 70 is electrically connected to, and is in communication with, the fuel monitoring means 64 and fuel monitoring microprocessor 46. The programmable read-only memory 70 is electrically connected to the operational control chip 38 via a first connecting data cable 78. The programmable read-only memory 70 is electrically connected to the silicon control rectifier 72 within the circuit unit 54.

The silicon control rectifier 72 is preferably in communication with the programmable read-only memory 70 and the valve 74. The silicon control rectifier 72 receives the second signal or digital pulses generated by the programmable read-only memory 70, which in turn opens the valve 74. Termination of power to the automobile anti-theft device 10 through the ignition 30, causes the silicon control rectifier 72 to terminate communication with the valve 74 thereby resulting in the closing of the valve 74 and termination of passage of fuel within the fuel line 18.

A fuel signal chip 76 may alternatively be included within the circuit unit 54. The fuel signal chip 76 is electrically connected to, and in communication with, the fuel monitoring means 64. The fuel signal chip 76 turn receives and transmits digital pulses to the fuel monitoring microprocessor 46. The fuel signal chip 76 is preferably a circuit board having electrical switches as is known in the art. Alternatively, the programmable read-only memory 70 may perform the functions of the fuel signal chip 76 at the preference of an individual.

The valve 74 is preferably attached in fuel-flow relationship to the fuel line 18 and/or to the fuel tank 16 of an automobile 12. The valve 74 is preferably of a solenoid type which is opened upon the receipt of the digital pulses of the second signal permitting fuel passage within the fuel line 18.

The valve 74 may be a non-return air valve type which permits air to purge into the fuel line 18 in the event that the personal access code is not accepted by the programmable read-only memory 70 as being identical to the stored key access. In the event that the personal access code is rejected, a vehicle will only be permitted to operate for approximately fifty yards pending the depletion of fuel from the fuel line 18. The residual fuel within the fuel line 18 downstream of the valve 74 provides time for entering the personal access code.

The electronic or solenoid valve 74 is normally maintained in a closed configuration terminating the flow of fuel to the engine 14. The activation of the silicon control rectifier 72 is transmitted via the programmable read-only memory 70 to the control unit 36 for engagement of the audio signal transmitter 52.

The fuel monitoring means 64 is attached in fuel-flow relationship to the fuel line 18 of a vehicle. The fuel monitoring means 64 is preferably electrically connected to, and in communication with, the programmable read-only memory 70 for monitoring the fuel passage within the fuel line 18. Alternatively, the fuel monitoring means 64 may be electrically connected to, and in communication with, the fuel signal chip 76 for monitoring fuel passage within the fuel line 18. (FIG. 4)

The fuel monitoring means 64 preferably includes a fuel-flow sensor which may be formed of a transponder 80 and transducer 82. The transponder 80 and transducer 82 monitor the flow of fuel passage within the fuel line 18 and generate a series of digital pulses for processing by the fuel-monitoring microprocessor 46 for display on the first means for display 40. The digital pulses generated by the transducer 80 and transponder 82 count the level of fuel consumption for a vehicle. The generated digital pulses are processed by the fuel monitoring microprocessor 46 for display of a digital output on the liquid crystal display for communication of the consumption of fuel to an accuracy of $\frac{1}{100}$ of a gallon.

The automobile anti-theft device 10 includes a remotely located programming unit 62 which in general includes a power source 84, an interface operational chip 86, a second means for display 88, a second means for input 90, and on/off switch 92, and a receiving adaptor 68. The programming unit 62 is preferably used for modification of the personal access code for the automobile anti-theft device 10. The programming unit 62 is preferably not provided to an individual upon installation of the automobile anti-theft device 10, and is maintained at a remote location such as an automobile dealership, police station or private security organization. Alternatively, the programming unit 62 may be provided to an individual so long as the programming unit 62 is retained at a physical location removed from the automobile protected by the automobile anti-theft device 10.

The power source 84 for the programming unit 62 may either be of a plug-in type or a self-contained battery unit at the preference of an individual.

The programming unit 62 preferably includes an interface operational chip 86. The interface operational chip 86 is preferably a circuit board having electronic microswitches as is known in the art. The interface operational chip 86 functions to receive and transmit digital pulses from the second means for input 90 for transmittal through the receiving adaptor 68 for reprogramming of the programmable read-only memory 70 for modification of the stored key access.

The second means for display 88 is preferably of a liquid crystal display type which is electrically connected to, and[ in communication with, the interface operational chip 86. The second means for display issued to communicate an alternate personal access code as modified by an individual. The second means for display 88 is preferably black-lighted for enhancement of the visibility to an individual.

The second means for input 90 is preferably of a telephone key-pad type for generation of a third digitized signal which is transmitted to the programmable read-only memory 70 for modification of the stored key access. The second means for input 90 may include a plurality of second finger keys 94 which may be marked with alphabetical or numeric characters. In addition, the second means for input 90 may include enter and clear keys as previously discussed.

The receiving adaptor 68 is electrically connected to and in communication with the interface operational chip 86 for coupling to the retractable penetrating adaptor 48 during modification of the stored key access. The receiving adaptor 68 is preferably connected to a cable which is electrically connected to the interface operational chip 86.

During use of the programming unit 62, an individual will couple the receiving adaptor 68 to the withdrawn retractable penetrating adaptor 48. An individual may then enter a desired modified personal access code into the second means for input 90. The interface operational chip 86 then transmits a digitized signal through the receiving adaptor 68, and retractable penetrating adaptor 48, to the operational control chip 38. The digitized signal is then transmitted to the programmable read-only memory 70 for modification of the stored key access.

It should be noted that the personal access code of the automobile anti-theft device 10 may be reprogrammed an infinite number of times as desired by an individual. The automobile anti-theft device 10 is preferably tamper-proof where the only access into the control unit 36 is provided by the power cable 34 and the first connecting data cable 78. Upon the cutting of either the power cable 34 or the first connecting data cable 78, the automobile anti-theft device 10 is rendered incapable of generating digital pulses for opening of the valve 74 thereby prohibiting the passage of fuel within the fuel line 18.

The tampering with the power cable 34 or first connecting data cable 78 does not disable the automobile anti-theft de:vice 10. The forcible entry into either the control unit 36 or the circuit unit 54 damages connecting pins and circuitry which incapacitates the silicon control rectifier 72 and valve 74 from receiving digital pulses for opening of the fuel line 18.

During use of the automobile anti-theft device 10, a vehicle owner/operator is required to enter the personal access code each time the ignition for the vehicle is engaged. The incorrect entry of a personal access code restricts fuel consumption for a vehicle by limiting the available fuel to the residual fuel within the fuel line 18 downstream of the valve 74. Upon the termination of the engagement of the ignition 30, the power to the automobile anti-theft device 10 is terminated. Termination of power prohibits the generation of digital pulses to the silicon control rectifier 72 and valve 74 causing the blockage of the fuel line 18.

The present invention may be embodied in other specific forms without departing from the spirit or essential attributes thereof; therefore, the illustrated embodiment should be considered in all respects as illustrative and not restrictive, reference being made to the appended claims rather than to the foregoing description to indicate the scope of the invention.

What is claimed:

1. A combination vehicle and vehicle anti-theft device comprising:
   (a) a vehicle;
   (b) a control unit affixed to the interior of said vehicle, said control unit being electrically connected to a power source for the provision of power to said vehicle anti-theft device, said control unit having a first means for input for generating a personal access code, a first means for display, an operational control chip in communication with said first means for display and said first means for input for communication of said personal access code, a retractable penetrating adapter in communication with said operational control chip, and a means of locking for restricting access to said retractable penetrating adapter;
   (c) a circuit unit having a valve attached in fuel-flow relationship to a fuel line of said vehicle, said circuit unit having a programmable read-only memory having a stored key access, said programmable read only memory being in communication with said operational control chip for receipt and comparison of said personal access code to said stored key access for communication of a compared signal, said valve being in communication with said programmable read-only memory for permitting fuel-flow passage within said fuel line upon receipt of said compared signal; and
   (d) an independent and remotely located programming unit separated from said vehicle, said programming unit having a power source, an interface operational chip, a second means for display in communication with said interface operational chip, a second means for input for generation of a change signal for modification of said stored key access within said programmable read-only memory, and a receiving adapter in communication with said interface operational chip for coupling to said penetrating adapter during modification of said stored key access within said programmable read-only memory.

2. The vehicle anti-theft device according to claim 1, further comprising a voltage regulator electrically connected to said control unit, between said control unit and said electrical system of said vehicle.

3. The automobile anti-theft device according to claim 2, further comprising a fuel-monitoring microprocessor in communication with said operational control chip and said first means for display.

4. An automobile anti-theft device comprising:
   (a) a control unit affixed to the interior of said automobile, said control unit being electrically connected to a power source for the provision of power to said automobile anti-theft device, said control unit having a first means for input for generating a personal access code, a first means for display, an operational control chip in communication with said first means for display and said first means for input for communication of said personal access code, a retractable penetrating adapter in communication with said operational control chip, and a means for locking for restricting access to said retractable penetrating adapter;
   (b) a circuit unit having a valve attached in fuel-flow relationship to a fuel line of said automobile, said circuit unit having a programmable read-only memory having a stored key access, said programmable read-only memory being in communication with said operational control chip for receipt and comparison of said personal access code to said stored key access for communication of a compared signal, said valve being in communication with said programmable read-only memory for permitting fuel-flow passage within said fuel line upon receipt of said compared signal;
   (c) a remotely located programming unit having a power source, an interface operational chip, a second means for display in communication with said interface operational chip, a second means for input for generation of a change signal for modification of said stored key access within said programmable read only memory, and a receiving adapter in communication with said interface operational chip for coupling to said penetrating adapter during modification of said stored key access within said programmable read-only memory;
   (d) a voltage regulator electrically connected to said control unit, between said control unit and said electrical system of said automobile; and
   (e) a fuel-monitoring microprocessor in communication with said operational control chip and said first means for display.

5. The automobile anti-theft device according to claim 4, wherein said programmable read-only memory is further connected to, and in communication with, said fuel-monitoring microprocessor.

6. The automobile anti-theft device according to claim 5, further comprising a fuel monitoring means attached in fuel-flow relationship to said fuel line and in communication with said programmable read-only memory for monitoring fuel-flow passage through said fuel line.

7. The automobile anti-theft device according to claim 6, wherein said means for locking comprises a lock and key.

8. The automobile anti-theft device according to claim 6, said control unit further comprising an interface control chip connected to, and in communication with, said operational control chip, said retractable penetrating adapter, and said first means for display.

9. The automobile anti-theft device according to claim 6, said circuit unit further comprising a silicon control rectifier connected to, and in communication with, said programmable read-only memory.

10. The automobile anti-theft device according to claim 9, wherein said valve is connected to, and in communication with, said silicon control rectifier.

11. The automobile anti-theft device according to claim 6, wherein said circuit unit further comprises a fuel signal chip connected to, and in communication with, said fuel monitoring microprocessor.

12. The automobile anti-theft device according to claim 11, wherein said fuel monitoring means is attached to, and in communication with, said fuel signal chip.

13. The automobile anti-theft device according to claim 12, said fuel monitoring means comprising a transducer and a transponder for monitoring fuel passage through said fuel line.

14. The automobile anti-theft device according to claim 6, wherein said second means for input comprises a plurality of second finger keys.

15. An automobile anti-theft device comprising:
(a) a voltage regulator electrically connected to an electrical system for said automobile;
(b) a control unit affixed to the interior of said automobile, said control unit being electrically connected to said voltage regulator for the provision of power to said automobile anti-theft device, said control unit having a first means for input for generating a personal access code, said control unit further having a first means for display, an operational control chip in communication with said first means for display and said first means for input for communication of said personal access code, a fuel-monitoring microprocessor in communication with said operational control chip and said first means for display, a retractable penetrating adapter in communication with said operational control chip, and a means for locking for restricting access to said retractable penetrating adaptor;
(c) a circuit unit having a valve attached in fuel-flow relationship to a fuel tank and a fuel line of said automobile, said circuit unit having a programmable read-only memory having a stored key access, said programmable read-only memory being in communication with said operational control chip for receipt and comparison of said personal access code to said stored key access for communication of a compared signal, said programmable read-only memory further being connected to, and in communication with, said fuel-monitoring microprocessor, said valve being in communication with said programmable read-only memory for permitting fuel-flow passage within said fuel line upon receipt of said compared signal;
(d) a fuel-monitoring means attached in fuel-flow relationship to said fuel line and in communication with said programmable read-only memory for monitoring fuel-flow passage through said fuel line; and
(e) a remotely located programming unit having a power source, an interface operational chip, a second means for display in communication with said interface operational chip, a second means for input for generation of a change signal for modification of said stored key access within said programmable read-only memory, an on-off switch, and a receiving adaptor in communication with said interface operational chip for coupling to said penetrating adapter during modification of said stored key access within said programmable read-only memory.

16. An automobile anti-theft device comprising:
(a) a voltage regulator electrically connected to an electrical system of said automobile;
(b) a control unit affixed to the interior of said automobile, said control unit being electrically connected to said voltage regulator for the provision of power to said automobile anti.-theft device, said control unit having a first means for input for generating a personal access code, said first means for input being a plurality of first finger keys, said control unit further having a first liquid crystal display, an interface control chip in communication with said first liquid crystal display, an operational control chip in communication with said first liquid crystal display and said interface control chip, said operational control chip being further in communication with said first means for input for communication of said personal access code, a fuel-monitoring microprocessor in communication with said operational control chip and said first liquid crystal display, a retractable penetrating adapter in communication with said interface control chip, and a means for locking for restricting access to said retractable penetrating adapter;
(c) a circuit unit having a valve attached in fuel-flow relationship to a fuel tank and a fuel line of said automobile, said circuit unit having a programmable read-only memory having a stored key access, said programmable read-only memory being in communication with said operational control chip for receipt and comparison of said personal access code to said stored key access for communication of a compared signal, a silicon control rectifier in communication with said programmable read-only memory, and a fuel signal chip in communication with said fuel-monitoring microprocessors said valve being in communication with said silicon control rectifier for permitting fuel-flow passage within said fuel line upon receipt of said compared signal;
(d) a fuel monitoring means attached in fuel-flow relationship to said fuel line and in communication with said fuel signal chip, said fuel monitoring means comprising a transducer and a transponder for monitoring fuel-flow passage through said fuel line; and
(e) a remotely located programming unit having a power source, an interface operational chip, a second liquid crystal display in communication with said interface operational chip, a second input means comprising a plurality of second finger keys; for generation of a change signal for modification of said stored key access within said programmable read-only memory, an on-off switch, and a receiving adapter in communication with said interface operational chip for coupling to said penetrating adapter during modification of said stored key access within said programmable read-only memory.

17. The automobile anti-theft device according to claim 16, wherein said voltage regulator is electrically connected to said electrical system of said automobile proximate to an ignition switch.

18. The automobile anti-theft device according to claim 16, wherein said control unit is encased within a durable resilient housing.

19. The automobile anti-theft device according to claim 18, wherein said means for locking comprises a lock and key for securely confining said retractable penetrating adapter within said housing.

20. The automobile anti-theft device according to claim 16, wherein said circuit unit is encased within a durable resilient housing.

\* \* \* \* \*

UNITED STATES PATENT AND TRADEMARK OFFICE
CERTIFICATE OF CORRECTION

PATENT NO. : 5,559,493
DATED : September 24, 1996
INVENTOR(S) : Daniel Karnwie-Tuah It is certified that error appears in the above-indentified patent and that said Letters Patent is hereby corrected as shown below:

Column 1, line 13, delete ":".

Column 5, line 21, delete "mad" and insert --read--.

Column 8, line 36, delete "[".

Column 9, line 54, delete "read only" and insert --read-only--.

Column 12, line 17, delete ".".

Signed and Sealed this

Tenth Day of June, 1997

Attest:

BRUCE LEHMAN

Attesting Officer

Commissioner of Patents and Trademarks